United States Patent
Haitani

(10) Patent No.: US 6,738,213 B2
(45) Date of Patent: May 18, 2004

(54) DISK DRIVE FOR CONTROLLING MAXIMUM CURRENT THAT FLOWS THROUGH SAME

(75) Inventor: Munehisa Haitani, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 303 days.

(21) Appl. No.: 09/945,223

(22) Filed: Aug. 30, 2001

(65) Prior Publication Data

US 2002/0030917 A1 Mar. 14, 2002

(30) Foreign Application Priority Data

Sep. 5, 2000 (JP) ........................................ 2000-269011

(51) Int. Cl.⁷ .......................... G11B 15/18; G11B 17/00; G11B 19/02
(52) U.S. Cl. ........................ 360/71; 360/75; 360/73.03; 360/78.13
(58) Field of Search ........................ 360/71, 75, 73.03, 360/78.13

(56) References Cited

U.S. PATENT DOCUMENTS

| | | | | |
|---|---|---|---|---|
| 4,658,308 A | * | 4/1987 | Sander, Jr. ................. | 360/74.1 |
| 4,679,102 A | * | 7/1987 | Wevers et al. ................. | 360/75 |
| 4,786,995 A | * | 11/1988 | Stupeck et al. ................ | 360/75 |
| 5,663,846 A | * | 9/1997 | Masuoka et al. .............. | 360/75 |
| 6,025,968 A | * | 2/2000 | Albrecht ....................... | 360/75 |
| 6,064,539 A | * | 5/2000 | Null et al. ..................... | 360/75 |
| 6,469,858 B1 | * | 10/2002 | Tsuyuguchi .............. | 360/73.03 |
| 6,567,232 B1 | * | 5/2003 | Klaassen ..................... | 360/75 |
| 6,574,062 B1 | * | 6/2003 | Bennett et al. ............... | 360/69 |

FOREIGN PATENT DOCUMENTS

JP    11-306501    11/1999

* cited by examiner

Primary Examiner—David Hudspeth
Assistant Examiner—Jason Olson
(74) Attorney, Agent, or Firm—Brinks Hofer Gilson & Lione

(57) ABSTRACT

A disk drive includes a disk from and to which information can be read and written; a disk driving motor for spinning the disk; a read/write head disposed in the vicinity of the disk; a head transfer mechanism for transferring the read/write head in the radial direction of the disk; and a controller for controlling the overall disk drive. The disk drive is connected to a host control unit through a Universal Serial Bus interface. When a step signal for driving the head transfer mechanism is output at a point at which the disk driving motor is activated, the controller immediately deactivates the disk driving motor and only actuates the head transfer mechanism to move step by step.

3 Claims, 5 Drawing Sheets

DISK DRIVE FOR CONTROLLING MAXIMUM CURRENT THAT FLOWS THROUGH SAME

BACKGROUND OF THE INVENTION

1. Field of the Invention

The present invention relates to disk drives, and more specifically, it relates to a disk drive which is connected to a host control unit through an interface such as a Universal Serial Bus (hereinafter referred to as "USB") interface and which controls the maximum current that flows through the disk drive, thus reducing the power consumption.

2. Description of the Related Art

In general, peripheral devices are connected to a host control unit such as a personal computer through a USB interface. The USB interface is for unifying connections of a personal computer with relatively low-speed peripheral devices such as a keyboard, mouse, modem, and printer by using the same type of connector and cable. Through a USB hub, many peripheral devices can be connected to a personal computer to form a star-shaped network. The USB connectors and USB cables are used to interconnect the USB hub and the personal computer and to interconnect the USB hub and the peripheral devices.

The power supply can be connected to the USB hub. The output of the power supply is supplied to the peripheral devices through the USB hub and the USB cables. Current that can be obtained from the power supply is limited by a characteristic of the USB hub, and generally the maximum current is approximately 500 mA.

Recently, a disk drive, particularly a floppy disk drive, has been connected to a personal computer using a USB-compliant connection. Specifically, the floppy disk drive is connected to the personal computer through the USB interface, and power for the floppy disk drive is obtained from the power supply connected to the USB hub.

When the floppy disk drive is connected to the personal computer using the USB-compliant connection, the maximum current available for the floppy disk drive is approximately 500 mA. In this case, the major current-consuming components of the floppy disk drive include a spindle motor for spinning a floppy disk and a stepping motor for actuating a head to move step by step. When the two motors are driven out of synchronization, the maximum driving current for each motor never exceeds a current limit of 500 mA. When the two motors are driven in synchronization, and when a starting current is introduced through the spindle motor, the sum of the two currents greatly exceeds 500 mA.

FIGS. 4A to 4D are waveform diagrams which illustrate examples of driving states of a stepping motor and a spindle motor in a conventional floppy disk drive. FIG. 4A illustrates the waveform of a step pulse signal. FIG. 4B illustrates the waveform of a stepping motor driving current. FIG. 4C illustrates the waveform of a spindle motor driving signal. FIG. 4D illustrates the waveform of a spindle motor driving current. The amplitude or current is plotted as the ordinate, and the time is plotted as the abscissa.

FIG. 5 illustrates a waveform when the starting current for the spindle motor and the driving current for the stepping motor of the conventional floppy disk drive overlap in time. The current is plotted as the ordinate, and the time is plotted as the abscissa.

As shown in FIGS. 4A and 4B, when a short-period step pulse signal is supplied to a stepping motor driving unit (not shown), the stepping motor immediately starts rotating step by step and actuates the head to perform a seek operation. A driving current which includes a low-amplitude fluctuating portion in the former half and a constant driving current in the latter half is directed to flow through the stepping motor. Neither driving current exceeds a current limit of 500 mA. When the supply of step pulse signals to the stepping motor driving unit is terminated, the stepwise rotation of the stepping motor stops, and the current returns to the initial value.

As shown in FIGS. 4C and 4D, when a spindle motor driving signal is supplied to a spindle motor driving unit (not shown), the spindle motor is activated. Upon activation, a starting current with a relatively high peak value flows through the spindle motor. When the spindle motor subsequently enters a steady rotation state, an approximately constant driving current flows through the spindle motor. The peak value of the starting current does not exceed a current limit of 500 mA.

As shown in FIG. 5, when the stepping motor is rotationally driven at a point at which the starting current starts flowing through the spindle motor, and when the driving current flows through the stepping motor, the starting current for the spindle motor and the driving current for the stepping motor overlap each other in time. The sum of the currents exceeds a current limit of 500 mA when the starting current for the spindle motor approaches its peak value. From this point onward, the sum of the currents continuously exceeds a current limit of 500 mA until the peak value of the starting current falls below a certain value.

In the conventional floppy disk drive, when the stepping motor and the spindle motor are not rotationally driven in synchronization with each other, the driving current for each motor does not exceed a current limit of 500 mA. However, when the starting current for the spindle motor and the driving current for the stepping motor overlap in time, the sum of the currents exceeds a current limit of 500 mA within a certain time range.

With respect to such a failure that occurs in conventional floppy disk drives, a floppy disk drive that aims to avoid such a failure is known.

When a stepping motor and a spindle motor are rotationally driven in synchronization with each other, the foregoing floppy disk drive stops the rotation of the stepping motor for a certain period of time from the time the spindle motor is started to be activated, that is, for a period of 250 to 500 ms which is approximately equal to a starting time of the spindle motor. As a result, a starting current for the spindle motor and a driving current for the stepping motor do not overlap in time, and hence the total current does not exceed a current limit of 500 mA.

In the above-described floppy disk drive, when the starting current flows through the spindle motor, the rotation of the stepping motor is stopped. As a result, the starting current for the spindle motor and the driving current for the stepping motor do not overlap in time, and hence the total current does not exceed a current limit of 500 mA. When a step pulse signal is supplied at a point at which the rotation of the stepping motor is stopped, the supply of the step pulse signal is ignored. When the stepping motor is reactivated after a stepping motor deactivation period, the rotational position of the stepping motor is deviated by a portion which corresponds to the ignored step pulse signal. Thus, the head cannot perform an accurate seek operation to a predetermined position, thereby causing a so-called seek error. The occurrence of such a seek error is prevented by somehow regenerating the ignored step pulse signal. If a device for regenerating a step pulse signal is provided, the configuration becomes more complex, and the cost is increased.

SUMMARY OF THE INVENTION

Accordingly, it is an object of the present invention to provide a disk drive for maintaining, without using an additional new component, the total current of the disk drive to be below a steady current limit without causing a seek error.

In order to achieve the foregoing objects, a disk drive according to the present invention is provided including a disk from and to which information can be read and written; a disk driving motor for spinning the disk; a read/write head disposed in the vicinity of the disk; a head transfer mechanism for transferring the read/write head in the radial direction of the disk; and a controller for controlling the entirety of the disk drive. When a step signal for driving the head transfer mechanism is output at a point at which the disk driving motor is activated, the controller immediately deactivates the disk driving motor and only actuates the head transfer mechanism to move step by step.

According to a disk drive of the present invention, when a disk driving motor (spindle motor) is activated at a point at which a starting current starts flowing through the disk driving motor, or when a step signal for driving a head transfer mechanism is output while the driving current is flowing through the disk driving motor, the rotation and driving of the disk driving motor is immediately stopped, and only a stepping motor which moves the head transfer mechanism step by step is rotationally driven. As a result, the total current of the disk drive is maintained to be below a steady current limit. Since part or the entirety of a supplied step signal never becomes invalid, no seek errors are caused. Thus, it becomes unnecessary to provide an additional unit for regenerating a step signal.

Preferably, the control unit reactivates the disk driving motor when the output of the step signal for driving the head transfer mechanism is terminated.

Accordingly, the disk driving motor which is once deactivated can be reactivated when the stepping motor stops rotating. Since a period in which a motor driving signal for rotationally driving the disk driving motor is supplied is longer than a period in which a step signal is supplied, the disk driving motor can be rotationally driven without supplying an additional motor driving signal.

DESCRIPTION OF THE PREFERRED EMBODIMENTS

The present invention will become clear from the following description of the preferred embodiments with reference to the accompanying drawings.

Figure 1:
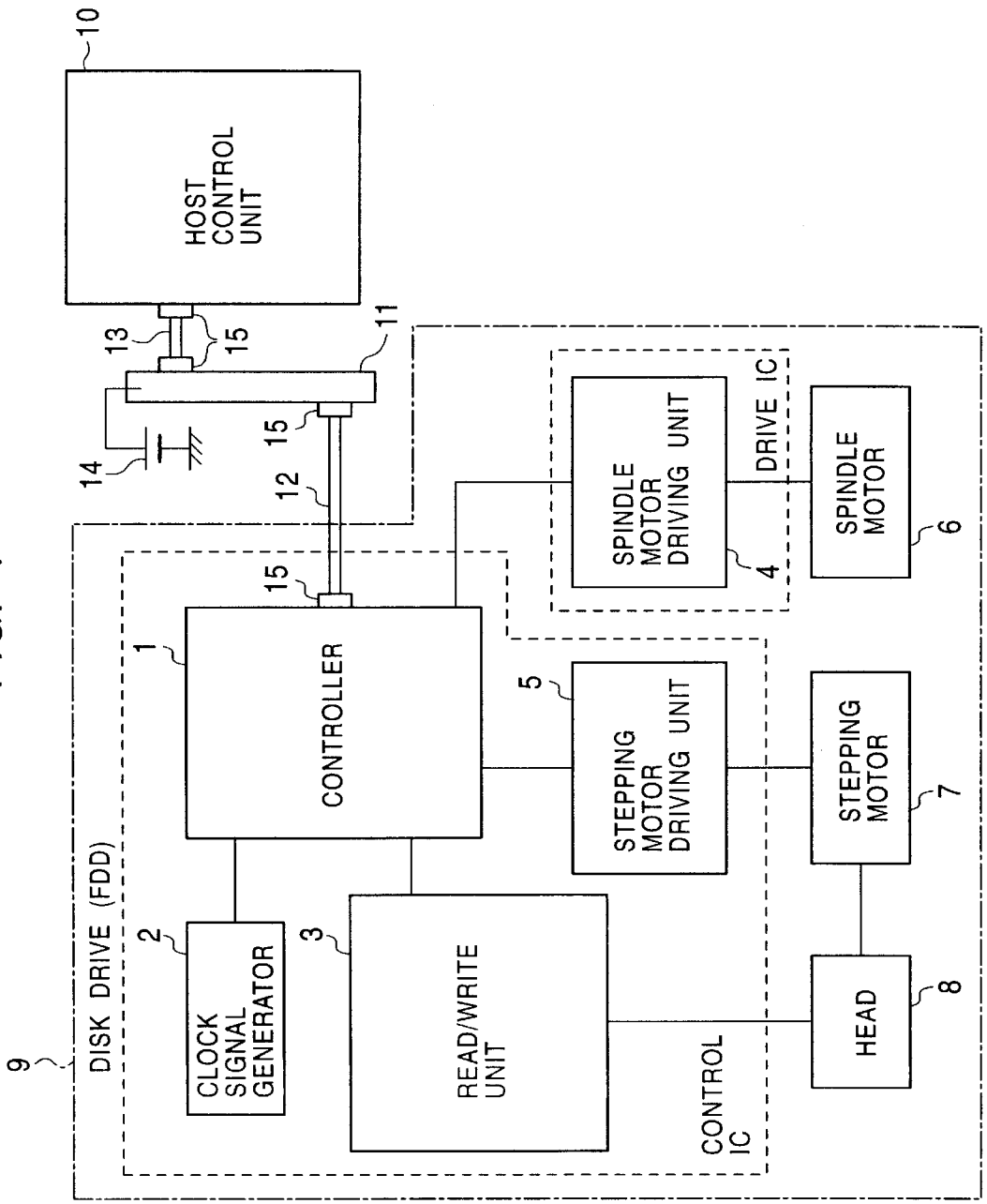
FIG. 1 is a block diagram of basic components of a disk drive according to an embodiment of the present invention.

FIG. 1 shows a disk drive according to an embodiment of the present invention. Specifically, FIG. 1 shows basic components of the disk drive.

As shown in FIG. 1, a disk drive (or floppy disk drive (FDD)) 9 of this embodiment includes a controller 1 that controls the operation of the overall disk drive; a clock signal generator 2 that generates clock signals; a read/write unit 3 that instructs the reading or writing of information from/to a floppy disk (not shown); a spindle motor driving unit 4 that drives a spindle motor 6 which is described below; a stepping motor driving unit 5 that drives a stepping motor 7 which is described below; the spindle motor (disk driving motor) 6 that rotationally drives the floppy disk; the stepping motor 7 which is rotated step by step and which moves a head 8 to a predetermined position on the floppy disk; and the head 8 which reads information recorded on the floppy disk and which writes information to the floppy disk. In this case, the controller 1, the clock signal generator 2, the read/write unit 3, and the stepping motor driving unit 5 are formed of a single control IC, and the spindle motor driving unit 4 is formed of a drive IC.

External devices connected to the disk drive 9 include a host control unit 10 such as a personal computer for controlling the disk drive 9; a USB bus (USB interface) for connecting the disk drive 9 (controller 1) to the host control unit 10; a USB cable 12 for connecting the disk drive 9 (controller 1) to the USB bus 11; a USB cable 13 for connecting the host control unit 10 to the USB bus 11; and a power supply 14 connected to the USB bus 11. Connectors 15 are used to connect the USB cable 12 to the controller 1, to connect the USB cable 12 to the USB bus 11, to connect the USB cable 13 to the host control unit 10, and to connect the USB cable 13 to the USB bus 11.

In the disk drive 9, the controller 1 is connected to the clock signal generator 2, the read/write unit 3, the spindle motor driving unit 4, and the stepping motor driving unit 5. The read/write unit 3 is connected to the head 8. The spindle motor driving unit 4 is connected to the spindle motor 6. The stepping motor driving unit 5 is connected to the stepping motor 7. The stepping motor 7 is connected to the head 8.

Figure 2A:
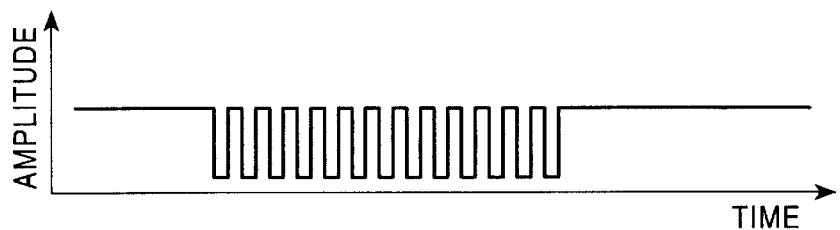
FIGS. 2A to 2D are waveform diagrams showing examples of driving states of a stepping motor and a spindle motor in a floppy disk drive shown in FIG. 1.
Figure 2B:
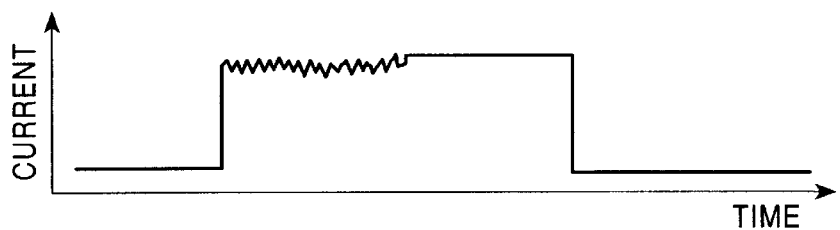
Figure 2C:
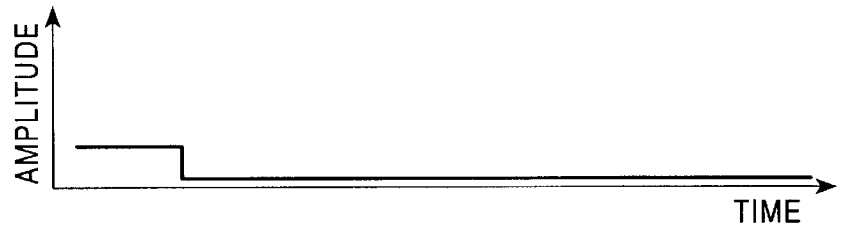
Figure 2D:
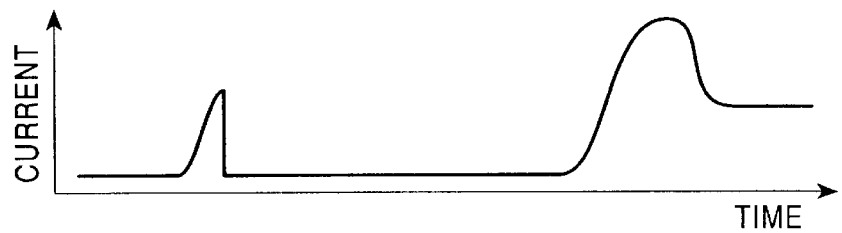

FIGS. 2A to 2D are waveform diagrams illustrating examples of driving states of the stepping motor 7 and the spindle motor 6 in the disk drive 9 shown in FIG. 1. FIG. 2A shows the waveform of a step pulse signal. FIG. 2B shows the waveform of a stepping motor driving current. FIG. 2C shows the waveform of a spindle motor driving signal. FIG. 2D shows the waveform of a spindle motor driving current. The amplitude or current is plotted as the ordinate, and the time is plotted as the abscissa.

Referring to FIG. 1 and FIGS. 2A to 2D, the operation of the disk drive 9 with the foregoing arrangement is described.

As shown in FIG. 2C, when the controller 1 under the control of the host control unit 10 starts controlling the rotation of the spindle motor 6, the controller 1 supplies a pulsed spindle motor driving signal that falls at that time to the spindle motor driving unit 4. When the stepping motor 7 is rotationally driven step by step, as shown in FIG. 2A, the controller 1 supplies a step pulse signal which is formed of short-period repetitive pulses and which is in accordance with a clock signal period at that time to the stepping motor driving unit 5. In response to the spindle motor driving signal, the spindle motor driving unit 4 supplies a rotational driving voltage for rotating the spindle motor 6 to the spindle motor 6. The rotation of the spindle motor 6 in turn spins the floppy disk. In response to the step pulse signal, the stepping motor driving unit 5 supplies to the stepping motor 7 a rotational driving voltage for rotating the stepping motor 7 by one step every time one pulse signal is received. The stepwise rotation of the stepping motor 7 in turn actuates a head transfer mechanism (not shown), thereby moving the head 8 in the radial direction of the floppy disk. As a result, the head 8 performs a seek operation. When reading information recorded on the floppy disk, the head 8 moves to a predetermined position on the floppy disk. Under the control of the read/write unit 3, the head 8 reads the information recorded on the floppy disk, and the read information is supplied to the controller 1 through the read/write unit 3. When writing information to the floppy disk, the head 8 moves to a predetermined position on the floppy disk. Information output from the controller 1 is supplied to the head 8 through the read/write unit 3, and the head 8 writes the information to the floppy disk.

While the disk drive 9 shown in FIG. 1 is operating, the spindle motor driving signal shown in FIG. 2C is supplied, and subsequently the step pulse signal shown in FIG. 2A is supplied. The operation in such a case will now be described.

As shown in FIG. 2C, the controller 1 supplies the spindle motor driving signal to the spindle motor driving unit 4. In response to the spindle motor driving signal, the spindle motor driving unit 4 promptly supplies a rotational driving voltage to the spindle motor 6. As shown in FIG. 2D, a suddenly-rising starting current is directed to flow through the spindle motor 6. While the starting current is rising, as shown in FIG. 2A, the controller 1 supplies the step pulse signal to the stepping motor driving unit 5. In response to the step pulse signal, the stepping motor driving unit 5 supplies to the stepping motor 7 a rotational driving voltage for rotating the stepping motor 7 by one step every time one pulse signal is received. As shown in FIG. 2B, a driving current for rotating the stepping motor 7 step by step is directed to flow, thereby actuating the head transfer mechanism. At this time, the controller 1 supplies the step pulse signal to the stepping motor driving unit 5 and an operation interrupt command to the spindle motor driving unit 4. In response to the operation interrupt command, the spindle motor driving unit 4 immediately stops driving the spindle motor 6. As a result, as shown in FIG. 3D, the starting current which was flowing through the spindle motor 6 until that moment stops flowing.

As shown in FIG. 2A, the controller 1 terminates the supply of the step pulse signals to the stepping motor driving unit 5. Subsequently, the controller 1 supplies an operation interrupt cancellation command to the spindle motor driving unit 4. As shown in FIG. 2C, in response to the operation interrupt cancellation command, the spindle motor driving unit 4 supplies a rotational driving voltage to the spindle motor 6 based on the spindle motor driving signal which has been continuously supplied thereto from the controller 1. At this time, as shown in FIG. 2D, a suddenly-rising starting current flows through the spindle motor 6. Subsequently, a constant rotational driving current flows through the spindle motor 6.

According to the disk drive 9, when the stepping motor 7 is rotationally driven step by step at a point at which a starting current is beginning to flow through the spindle motor 6, a driving current is directed to flow through the stepping motor 7. Immediately after this, the flow of starting current through the spindle motor 6 is stopped. Thus, the starting current for the spindle motor 6 and the driving current for the stepping motor 7 do not overlap in time, and the current consumed by the disk drive 9 does not exceed a current limit of 500 mA. When the step pulse signal is supplied, the head transfer mechanism is actuated every time one pulse signal is supplied. As a result, no seek errors are caused. It becomes unnecessary to provide an additional step pulse signal regenerating unit for regenerating an invalid step pulse signal.

Figure 3A:
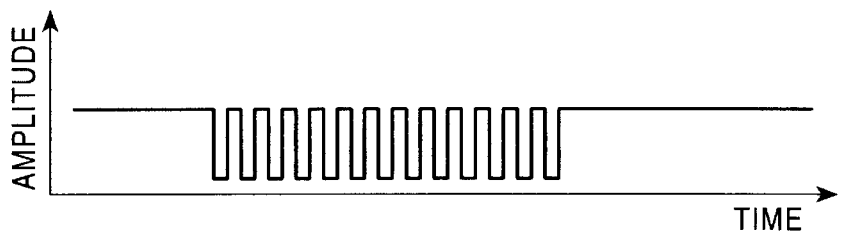
FIGS. 3A to 3D are waveform diagrams showing other examples of driving states of the stepping motor and the spindle motor in the floppy disk drive shown in FIG. 1.
Figure 3B:
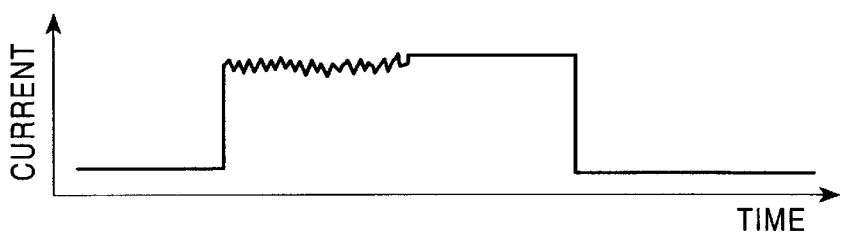
Figure 3C:
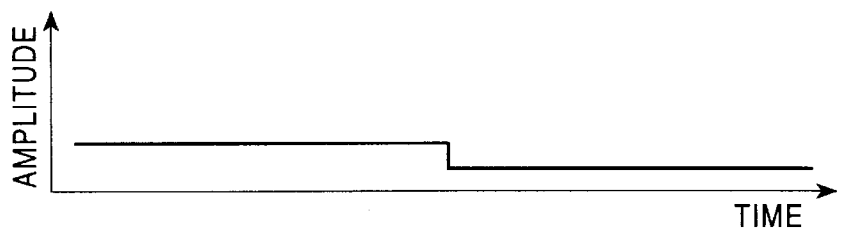
Figure 3D:
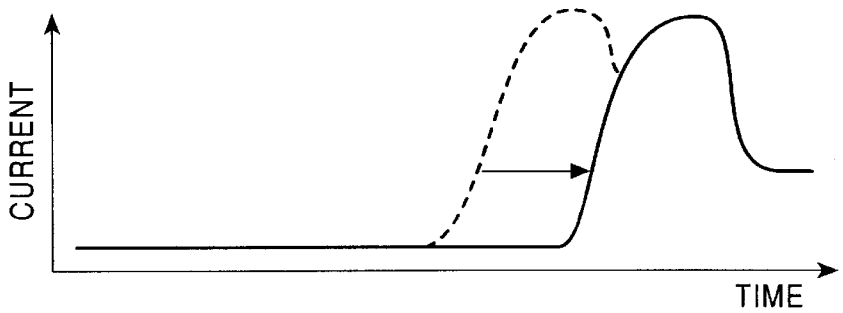
Figure 4A:
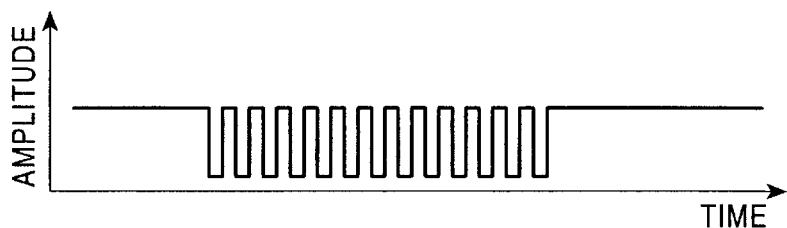
FIGS. 4A to 4D are waveform diagrams of examples of driving states of a stepping motor and a spindle motor in a conventional floppy disk drive.
Figure 4B:
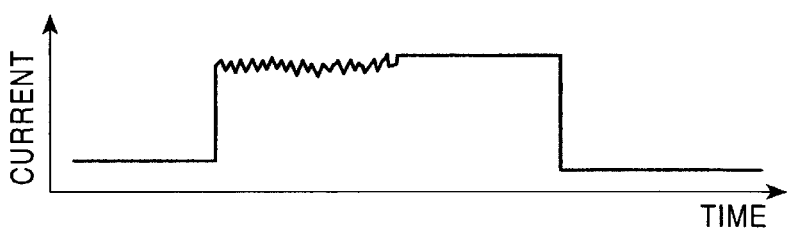
Figure 4C:
Figure 4D:
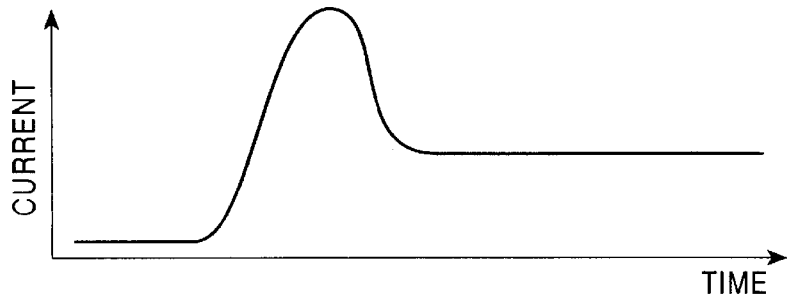
Figure 5:
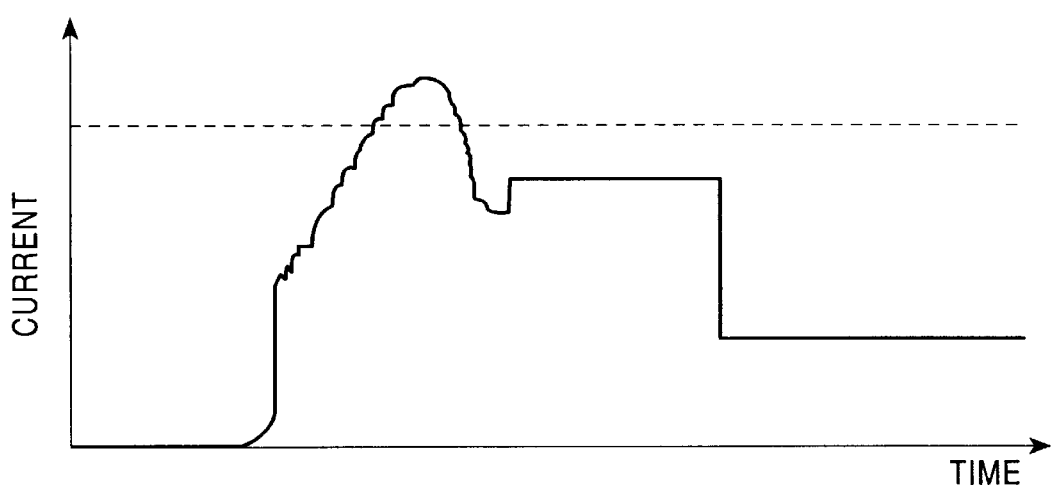
FIG. 5 is a waveform diagram of a case in which a starting current for the spindle motor and a driving current for the stepping motor of the conventional floppy disk drive overlap in time.

FIGS. 3A to 3D are waveform diagrams showing other examples of driving states of the stepping motor 7 and the spindle motor 6 of the floppy disk drive 9 shown in FIG. 1. FIG. 3A illustrates the waveform of a step pulse signal. FIG. 3B illustrates the waveform of a stepping motor driving current. FIG. 3C illustrates the waveform of a spindle motor driving signal. FIG. 3D illustrates the waveform of a spindle motor driving current. The amplitude or current is plotted as the ordinate, and the time is plotted as the abscissa.

The operation shown in FIGS. 2A to 2D illustrates a case in which, immediately after the spindle motor driving signal is supplied from the controller 1 to the spindle motor driving unit 4, the step pulse signal is supplied from the controller 1 to the stepping motor driving unit 5. In contrast, the operation shown in FIGS. 3A to 3D illustrates a case in which, while the step pulse signal is being supplied from the controller 1 to the stepping motor driving unit 5, the spindle motor driving signal is supplied from the controller 1 to the spindle motor driving unit 4.

With reference to FIGS. 3A to 3D, the operation will now be described. As shown in FIG. 3A, the step pulse signal is supplied, and the stepping motor 7 is rotationally driven step by step in response to the step pulse signal. As shown in FIG. 3B, the driving current flows through the stepping motor 7, and the flow of driving current continues until the supply of the step pulse signals is terminated. As shown in FIG. 3C, even when the spindle motor driving signal is supplied from the controller 1 to the spindle motor driving unit 4 while the step pulse signal is being supplied, an operation interrupt command is supplied thereafter from the controller 1 to the spindle motor driving unit 4. As a result, the spindle motor driving unit 4 does not respond to the spindle motor driving signal nor supplies the rotational driving voltage to the spindle motor 6. Accordingly, as shown in FIG. 3D, a starting current which is supposed to be generated at a point indicated by dotted lines is not generated.

As shown in FIG. 3A, when the controller 1 terminates the supply of the step pulse signals to the stepping motor driving unit 5, the controller 1 supplies an operation interrupt cancellation command to the spindle motor driving unit 4. As shown in FIG. 3C, in response to the operation interrupt cancellation command, the spindle motor driving unit 4 supplies a rotational driving voltage to the spindle motor 6 based on the spindle motor driving signal which has been continuously supplied thereto from the controller 1. As shown in FIG. 3D, a suddenly-rising starting current flows through the spindle motor 6. Subsequently, a constant rotational driving current flows through the spindle motor 6.

In the operation illustrated in FIGS. 3A to 3D, the starting current for the spindle motor 6 and the driving current for the stepping motor 7 do not overlap in time. Thus, the current consumed by the disk drive 9 does not exceed a current limit of 500 mA. When the step pulse signal is supplied, the head transfer mechanism is actuated every time one pulse signal is supplied. As a result, no seek errors are caused. It becomes unnecessary to provide an additional step pulse signal regenerating unit for regenerating an invalid step pulse signal.

Although a case in which the disk drive 9 is a floppy disk drive has been described in the above embodiment, the disk drive 9 according to the present invention is not limited to this case. For example, a disk drive other than a floppy disk drive can be used as long as the disk drive is capable of reading and writing information to a disk.

Although a case in which a current limit which is the maximum current consumed by the disk drive 9 is 500 mA has been described in the above embodiment, the current limit of the disk drive 9 according to the present invention is not limited to 500 mA. For example, the current limit can be a value which is slightly greater than 500 mA.

Although a case in which the disk drive 9 and the host control unit 10 are interconnected through the USB interface 11 has been described in the above embodiment, an interface for interconnecting the disk drive 9 and the host control unit 10 of the present invention is not limited to the USB interface 11. For example, an interface other than the USB interface 11 can be used.

What is claimed is:

1. A disk drive comprising:

a disk from and to which information can be read and written;

a disk driving motor to rotate said disk;

a read/write head disposed in a vicinity of said disk;

a head transfer mechanism to transfer said read/write head in a radial direction of said disk; and a controller to control an entirety of said disk drive;

wherein, when a step signal to drive said head transfer mechanism is output at a point at which said disk driving motor is activated, said controller immediately deactivates said disk driving motor and only actuates said head transfer mechanism to move stepwise.

2. A disk drive according to claim 1, wherein, when an output of the step signal is terminated, said control unit reactivates said disk driving motor.

3. A disk drive according to claim 1, wherein said disk drive is connected to a host control unit through a Universal Serial Bus interface.

* * * * *